United States Patent [19]

Hugard et al.

[11] Patent Number: 5,136,711
[45] Date of Patent: Aug. 4, 1992

[54] SYSTEM FOR MULTIPLE ACCESS HARD DISK PARTITIONING

[75] Inventors: James M. Hugard, El Toro, Calif.; George C. Y. Li, Kowloon, Hong Kong

[73] Assignee: AST Research, Irvine, Calif.

[21] Appl. No.: 602,358

[22] Filed: Oct. 17, 1990

[51] Int. Cl.⁵ .............................................. G06F 9/06
[52] U.S. Cl. .......................... 395/700; 364/DIG. 1; 364/280.2; 364/280.9
[58] Field of Search .................. 395/700, 200; 364/DIG. 1, DIG. 2

[56] References Cited

U.S. PATENT DOCUMENTS

| | | | |
|---|---|---|---|
| 4,779,187 | 10/1988 | Letwin | 364/DIG. 1 |
| 4,928,237 | 5/1990 | Bealkowski et al. | 364/DIG. 1 |
| 4,982,324 | 1/1991 | McConaughy et al. | 395/200 |
| 4,984,149 | 1/1991 | Iwashita et al. | 364/DIG. 1 |

Primary Examiner—Thomas M. Heckler
Attorney, Agent, or Firm—Knobbe, Martens, Olson & Bear

[57] ABSTRACT

A system for integrating incompatible hard disk partitioning systems in a single hard disk drive provides a method for installing and operating multiple incompatible absolute zero sector operating systems on the same hard disk drive with a first operating system and its associated boot loader located at absolute physical sector zero and a second operating system and its associated boot loader located at an absolute physical sector other than zero. The system includes a second BIOS that automatically offsets physical addresses for disk requests from the second operating system so that correct absolute physical address of the disk is accessed. This facilitates the use of a single hard disk drive in dual-compatible computers which functions selectively in an IBM AT compatible mode and a non-IBM AT compatible mode.

3 Claims, 5 Drawing Sheets

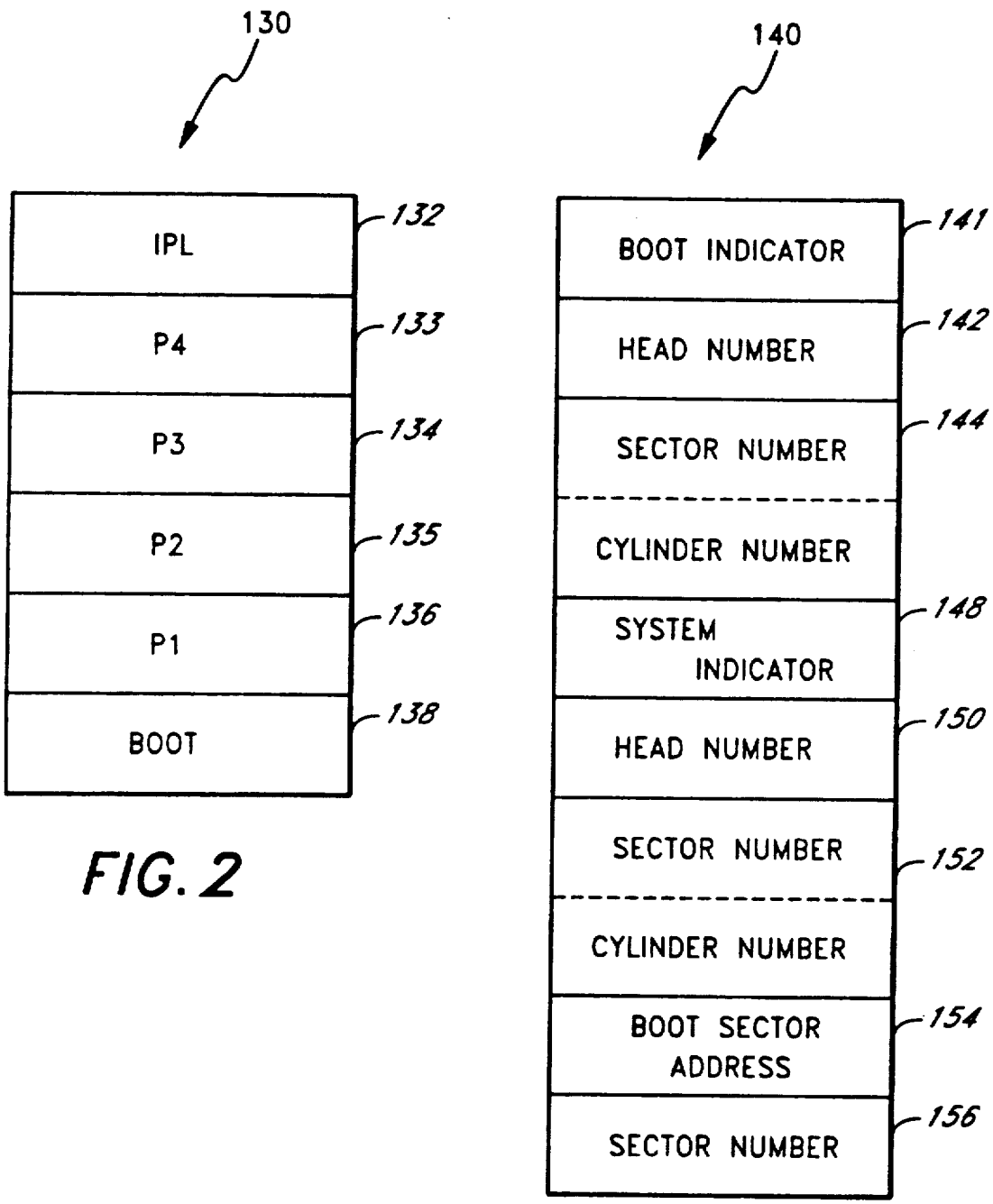

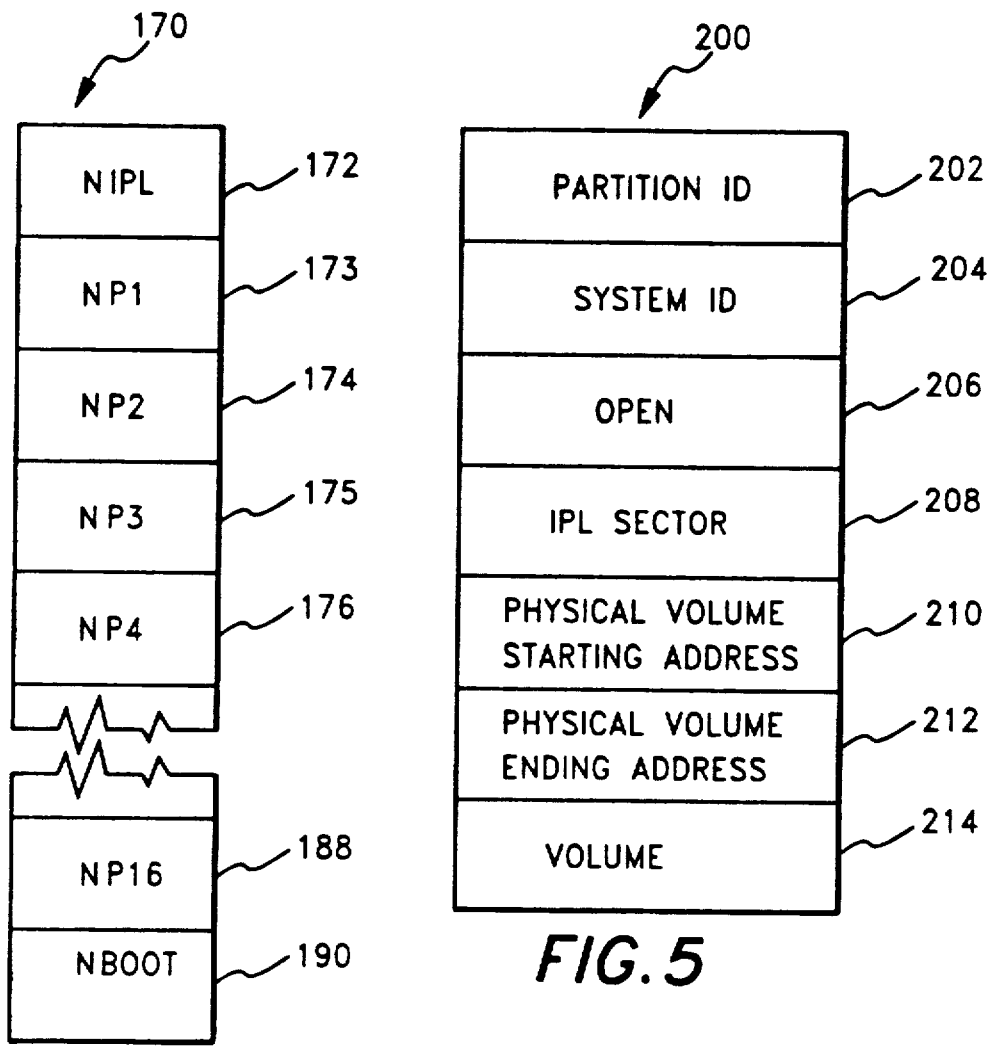
FIG.4
FIG.5
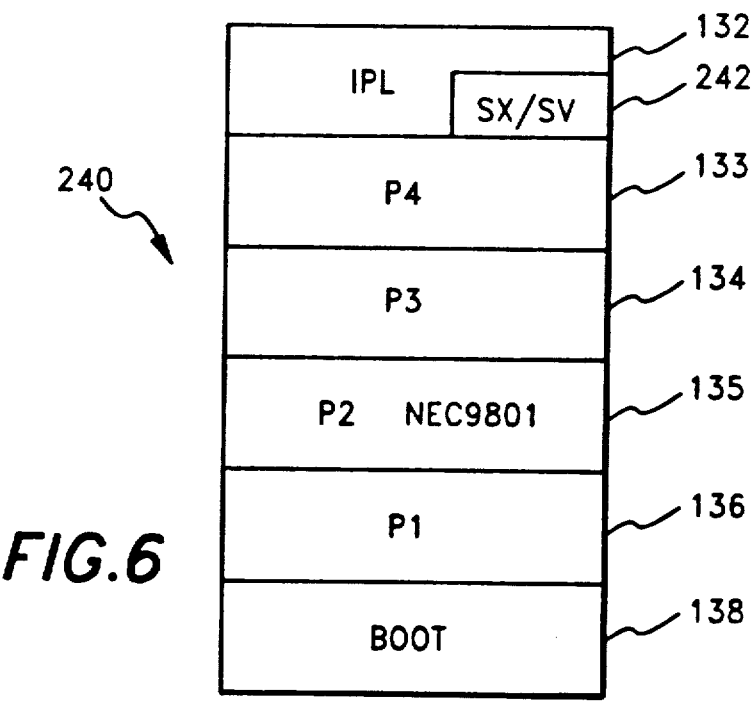
FIG.6

SYSTEM FOR MULTIPLE ACCESS HARD DISK PARTITIONING

BACKGROUND OF THE INVENTION

1. Field of the Invention

The present invention relates to improvements in dual compatibility computers and involves a method for allowing operation of multiple incompatible operating systems upon different disk partitions in the same hard disk drive.

2. Description of the Related Art

The IBM AT compatible computer, which uses an Intel 80×86 microprocessor is one of the most common standards for desk top computers in the United States. Microprocessors that are 80×86 compatible are also used in computers in Japan. For example, the NEC 9801 computer utilizes such an 80×86 compatible microprocessor. Many compatibilities exist between the IBM AT compatible computer standard and the NEC 9801 computer. These compatibilities make it possible to develop a double-compatible computer. However, numerous incompatibilities exist, particularly involving Input/Output (I/O) device addresses, I/O busses, peripheral devices, the Basic Input Output System (BIOS) used to manipulate hardware, and the operating systems. Some hardware incompatibilities can be solved by using hardware which is mode selectable. However, in many cases, this requires redundant hardware, each set operating in one mode or the other. This is often impractical and undesirable.

Neither the IBM AT compatible nor the NEC 9801 compatible operating systems allow for divisions (called partitions in the AT compatible systems and volumes in the NEC 9801 compatible systems) of the hard disk over and above the normal divisions used by the respective operating systems. A partition table holds information regarding the disk partitions. However, no provision was made in either the IBM AT or the NEC 9801 systems for booting up under a different hardware or non-compatible software configuration. The IBM AT compatible operating system originally had partition table definitions for DOS-12, DOS-16 and Extended DOS partitions and has been extended to allow other operating systems such as XENIX, Novell, CP/M-86, PCIX and others. However, these operating systems were programmed to be compatible only with the IBM AT operating system hard disk partition tables.

The NEC 9801 operating system was not programmed to be compatible with the IBM AT system, and the partition table and the Initial Program Load (IPL) boot loader of the NEC 9801 is incompatible with the partition table and IPL boot loader of the IBM AT. Moreover, each operating system assumes that its IPL and partition tables are located at absolute sector zero on the hard disk. Therefore, the IBM AT system does not provide a definition to identify that the NEC 9801 system is installed somewhere on the hard disk. If only one hard disk is used in the dual-compatible computer, then installing both operating systems will not be possible because if both systems are installed on the same hard disk then the IBM AT compatible operating system will write to the disk space occupied by the NEC partition because nothing indicates to the IBM AT system that the NEC operating system is present on the hard disk.

Likewise, the NEC operating system assumes that it has use of absolute sector zero on the hard disk and would overwrite AT operating system disk space.

Installing each operating system on a different hard disk drive provides a solution, but this requires redundant hardware. As explained, this is uneconomical and undesirable.

Tomcat Company, a Japanese corporation, attempted to solve this problem by making an assumption that the NEC 9801 compatible operating system is installed after the last AT partition on the hard disk and that no other disk partitions will follow the NEC 9801 system partition. This assumption solves the problem of the IBM AT system accessing NEC 9801 hard disk space. Once this assumption is made, then the NEC 9801 basic I/O system (BIOS) can reference all disk access calls past the last AT partition and the AT system can limit disk usage to the defined AT partition space, which precedes the NEC 9801 disk space. However, if the user attempts to create another AT partition, this would overwrite the NEC 9801 data, causing a complete loss of NEC 9801 data without warning.

Accordingly, a reasonable solution to the problem would utilize a method to operate both systems without making the assumption that the user will not change the partitioning of the hard disk.

Implementing a solution should allow installation and booting of two absolute zero sector IPL code segment and accompanying partition tables on the same disk. A solution to this problem would dramatically improve the feasibility of the IBM AT/NEC 9801 dual-compatible computers.

SUMMARY OF THE INVENTION

The present invention provides a system which allows use of two or more absolute zero sector boot loaders on the same hard disk drive by enhancing one of the partition tables and modifying the BIOS of one of the systems. The present invention allows the dual compatible computer to operate both operating systems as if the corresponding boot loader (IPL) and partition tables were installed at absolute sector zero on the hard disk.

One aspect of the present invention involves a method for operating first and second absolute sector zero boot loaders on a disk drive in a computer having first and second operating modes. The first boot loader includes first boot load instructions and a first partition table identifying a first operating system associated with the first boot loader. The second boot loader includes second boot load instructions and a second partition table identifying a second operating system associated with the second boot loader. The method comprises the steps described below.

A first boot loader is stored at absolute sector zero of the disk drive and includes a mode identifier that indicates the operating mode of the computer. A second boot loader is stored at a selected sector of the disk drive other than sector zero. An identifier is stored for the second boot loader in the first partition table of the first boot loader. This identifier includes a pointer to the selected sector at which the second boot loader is located. Upon initialization of the computer, a first BIOS identifies the boot mode. If the first boot mode is selected, then the normal boot load of the first boot loader continues. If the second boot mode is selected, then a second BIOS is loaded, the first partition table is examined to locate the starting sector of the second boot loader, the second BIOS is adjusted with an offset value corresponding to the starting sector of the second boot loader, and then the second boot loader is executed. Under this method, the second boot loader operates without modification as if loaded at absolute sector zero.

The computer includes a basic I/O system (BIOS) that controls access to the disk drive, and the method also further includes the steps of storing a mode indicator when initializing the computer to designate which of the first and second operating systems is active; and responding to a disk access request that includes an address to a sector of the disk by checking the mode indicator and adding an offset to the address equal to the absolute address of the selected sector of the disk when the mode indicator designates the second operating system.

The second partition table also includes sector numbers that identify partition boundaries for sectors allocated to the second operating system. These partition boundaries are referenced to absolute sector zero, but the sectors allocated to the second operating system are physically located on the disk at absolute sector addresses above the selected sector. The BIOS automatically adds the offset to addresses for disk accesses from the second operating system so that the second operating system can reference disk addresses to absolute sector zero and transfer data to and from the sectors allocated to the second operating system.

BRIEF DESCRIPTION OF THE DRAWINGS

FIG. 2 illustrates the organization of an IBM-AT compatible partition table.

FIG. 3 illustrates a more detailed view of the organization of one partition cell of FIG. 2.

FIG. 4 illustrates the organization of an NEC 9801 compatible partition table.

FIG. 5 illustrates a more detailed view of the organization of one partition cell of FIG. 4.

FIG. 6 illustrates a modified IBM AT partition table of the present invention.

DETAILED DESCRIPTION OF THE PREFERRED EMBODIMENT

Figure 1:
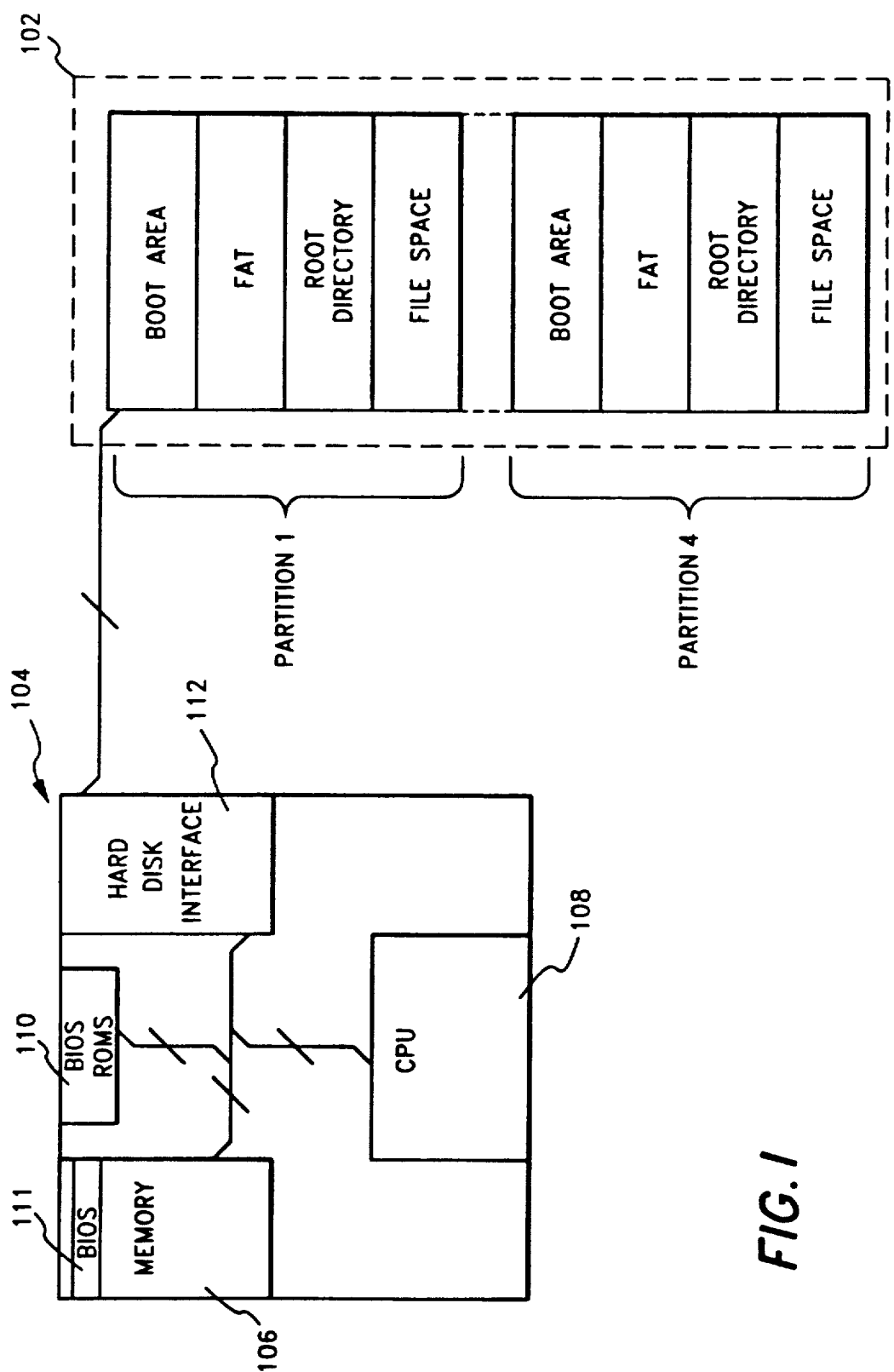
FIG. 1 illustrates a simplified block diagram of an IBM AT compatible computer including the simplified organization of a hard disk space usage.

FIG. 1 illustrates a block diagram of a hard disk 102 and its basic supporting platform resources 104, including a memory 106, a CPU 108, BIOS ROMs (Read Only Memory) 110, BIOS space allocated in the memory 106 and a hard disk interface 112. It also shows the simplified organization of the hard disk 102.

The hard disk can be divided into consecutive partitions (physical divisions in the disk drive). These partitions may be used by various operating systems and each partition is owned by its corresponding operating system. The partitions of a disk drive are defined in a partition block located at the physical first sector of the hard disk.

An AT compatible partition block 130 located at the physical first sector of the hard disk (absolute sector zero) is shown in FIG. 2. This partition block 130 consists of an initial program load (IPL) segment 132 which provides a boot loader, four partition identifier segments 133, 134, 135, 136 corresponding to four potential disk partitions P4, P3, P2, and P1 respectively, and a boot segment 138.

Each of the partition identifier segments 133, 134, 135, and 136 comprises 16 bytes of disk space making up a partition table 140 (FIG. 3) containing identification information for the corresponding disk partition.

Because the same organization applies to all four partition identifier segments 133, 134, 135, and 136 which correspond to disk partitions P4, P3, P2, and P1 respectively, the information provided in each partition table 140 is described in reference to partition identifier segment 133 which corresponds to partition P4 only.

The partition table 140 comprises a boot indicator byte 141 to identify whether the corresponding partition segment P4 is a bootable partition or a non-bootable partition. Only one partition of P4, P3, P2, and P1 may be bootable at a given time. The partition table further comprises a physical starting head number byte 142, a physical starting cylinder and physical starting sector segment 144, a system indicator byte 148 which identifies the type of operating system, a physical ending head number byte 150, a physical ending cylinder and physical ending sector segment 152, a boot sector address segment 154, and a sector number segment 156 which indicates the number of sectors in the partition P4 as is well understood in the art. The system indicator byte 148 utilizes pre-defined identifiers (e.g. 01H identifies IBM/MS DOS with a 12 bit File Allocation Table (FAT)) to designate any IBM AT compatible operating system such as IBM/MS-DOS (12 bit FAT, 16 bit FAT, and Extended DOS), XENIX, NOVELL, CP/M-86, PCIX, or non-DOS as is well understood in the art. Note that NEC 9801 would normally fall into the non-DOS category, but the partition tables and IPL code are not compatible.

An exemplary NEC 9801 compatible partition block 170 is shown in FIG. 4. The NEC 9801 compatible partition block 170 is similar, but not identical to the IBM AT compatible partition block 130. The NEC 9801 partition block 170 is conventionally located at the first physical sector in the hard disk. This partition block 170 comprises an NIPL (NEC initial program load) boot loader 172, sixteen volume identifier segments 173-188 corresponding to sixteen potential volumes NP1-NP16 on the hard disk 102 (NEC 9801 volumes correspond to IBM AT partitions), and a menu program (BOOT) segment 190. Each of the volume identifier segments 173-188 comprises 32 bytes of disk space forming a volume table 200 (FIG. 5) for each corresponding volume NP1-NP16.

The contents of an exemplary partition table 200 corresponding to NPI are shown in FIG. 5. This partition table 200 comprises a partition identifier segment 202 which indicates whether the partition NPI is bootable, a system identifier segment 204 which indicates whether partition NPI is active (accessible by the operating system), an open (unused) segment 206, an IPL sector segment 208 which indicates the boot sector address, a physical volume starting address segment 210 which indicates the physical starting address for the partition NPI, a physical volume ending address segment 212 which indicates the ending address for the partition NPI, and a volume name segment 214 as is well understood in the art. One advantage of the present invention is that no modifications to the contents of the NEC 9801 partition block 170 and the corresponding volume table 200 are necessary. Therefore, no further explanation of the NEC 9801 partition block 170 is necessary.

The IBM AT partition block 130 and the NEC 9801 partition block 170 can not co-exist at the physical first sector (absolute sector zero) on the same hard disk 102. However, the present invention provides a method whereby the AT compatible and NEC 9801 compatible bootable operating systems can be located on the same hard disk drive without modification to the operating system. To allow for both operating systems on the same disk, the AT partition block is enhanced as described below.

FIG. 6 illustrates an enhanced AT compatible partition block 240 of the present invention which is located at the physical first sector on the hard disk 102. The AT partition block is enhanced to include a mode identifier 242 in the last two bytes in the IPL segment 132. This mode identifier 242 indicates the mode of computer operation—NEC 9801 or IBM AT compatible.

The corresponding partition tables 140 are unaltered except that a new system identifier for the NEC 9801 operating system is provided. The previously undefined system identifier for the NEC 9801 compatible system can be stored in the system indicator byte 148 of the partition table 140.

According to the present invention, if, for instance, partition P2 is chosen for NEC 9801 partition installation as shown in FIG. 6, this newly defined identifier indicates to other AT partition table compatible operating systems occupying the other partitions P1, P3, and P4 that partition P2 and its corresponding disk space are used by the NEC 9801 operating system. This prevents the other operating systems from writing to disk space used by the NEC 9801 system.

The NEC 9801 partition block 170 is then located on the disk at a location other than absolute sector zero. However, the NEC 9801 operating system uses physical sector addresses to access the hard disk assuming that the NEC 9801 partition block 170 is located at absolute sector zero on the hard disk. Under the present invention, the unmodified NEC 9801 operating system continues to access the disk as if the NEC 9801 partition block 170 were located starting at absolute sector zero.

A NEC 9801 compatible BIOS (not shown) generally controls disk function requests from the NEC 9801 compatible operating system. To allow the NEC 9801 operating system to properly access its corresponding partitions when the partition block 170 is not located at absolute sector zero requires modification to the NEC 9801 compatible BIOS disk access routines as describe hereinafter.

COMPUTER BOOT SEQUENCE

Figure 7:
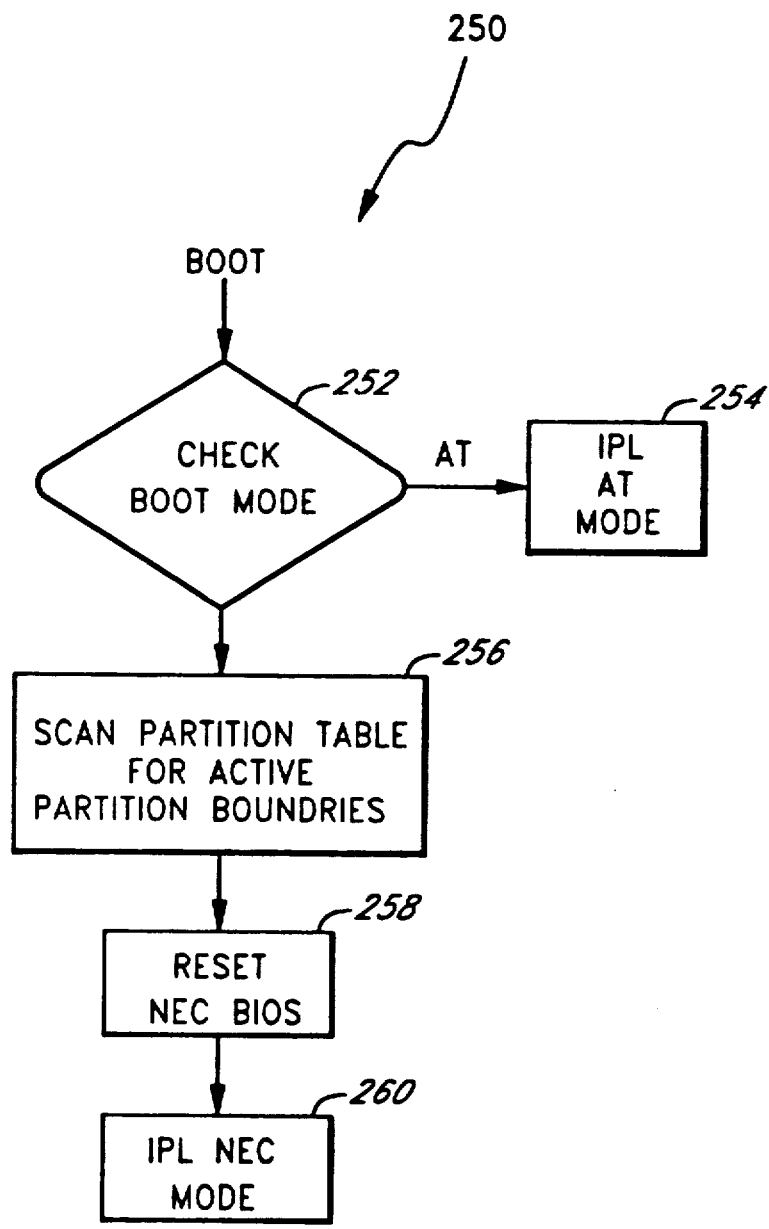
FIG. 7 illustrates a flow chart for booting the dual-compatible computer of the present invention.

Upon start-up of the dual-compatible computer, the system follows a program load sequence depicted in the flow chart 250 depicted in FIG. 7. A user of the dual-compatible computer can initiate start-up operations according to two methods: powering the system on (cold-boot) and performing a reset (warm-boot) from a keyboard (not shown). In either case, the AT compatible BIOS is modified to check the boot mode of the computer as represented in decision tree 252.

Upon cold-boot, the computer assumes an AT BIOS boot. The modified AT compatible BIOS scans the IPL 132 of the partition block 240 and locates the mode indicator 242 to determine in which mode the computer should boot. If the mode indicator 242 identifies AT compatible as the computer mode, the computer proceeds with an AT compatible IPL boot load sequence as represented by activity block 254, as is well understood in the art. If the mode indicator 242 identifies the NEC 9801 mode as active, then the IPL scans 256 the partition table to determine the boundaries of the active NEC 9801 compatible partition as represented in activity block 256. These boundaries provide an offset for all subsequent logical address hard disk function calls. This offset is then stored in the memory 106 in the BIOS space 111. Then, the NEC BIOS (not shown) is reset (moved into BIOS space 111 in memory 106) as represented by activity block 258, and the computer continues with an IPL boot load sequence for the NEC 9801 mode as represented by activity block 260.

If start-up is initiated by a warm-boot, then a bit is set in a CMOS (complementary metal oxide semiconductor, not shown) indicating the mode of computer operation. The AT compatible BIOS checks the boot mode (activity block 252) by checking the bit in the CMOS to determine the operating mode of the computer and ignores the mode indicator 242 in the enhanced partition block 240. The start-up operations then proceed as previously described for a cold-boot as shown in the flow-chart 250 in FIG. 7.

NEC 9801 DISK FUNCTION CALLS

Because the AT compatible partition block 240 is located at absolute sector zero of the hard disk, no adjustments are made for disk functions in the AT compatible mode. Therefore, if the computer is not operating in the NEC 9801 mode, it will perform conventional AT compatible disk functions, as is well understood in the art.

The NEC 9801 compatible system also assumes that the NEC 9801 compatible partition block 170 is located at absolute sector zero on the hard disk. However, the NEC 9801 compatible partition block 170 is installed at a sector other than absolute sector zero. Thus, when the computer operates in the NEC 9801 compatible mode, disk function calls must be adjusted for the appropriate sector on the hard disk where the NEC 9801 partition block 170 is located.

Figure 8:
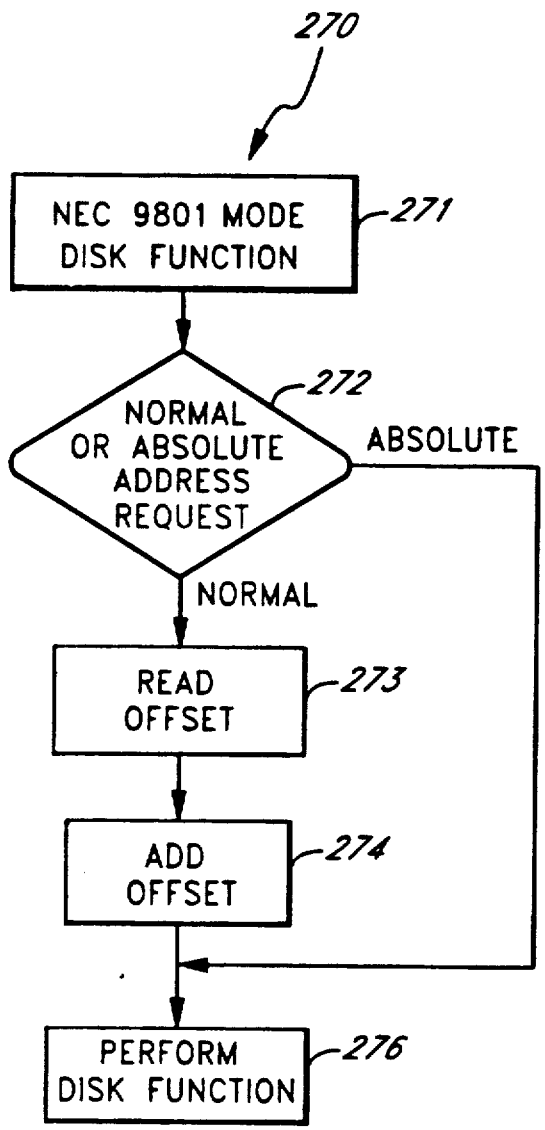
FIG. 8 illustrates a flow chart for disk functions performed according to the present invention.

When the NEC 9801 operating system requests a hard disk function, represented by activity block 271, the BIOS in memory 111 (which is a copy of the NEC 9801 compatible BIOS) receives a disk access call, and the BIOS 111 performs the procedure as illustrated in the flow chart 270 in FIG. 8. First, the BIOS determines whether the disk access request involves a normal (logical) address or an absolute address request, as represented in decision tree 272. If the disk function involves an absolute address request then the hard disk function is performed as is well understood in the art, represented by activity block 276. If the hard disk function involves a normal address request, then the BIOS 111 reads the offset, represented by activity block 273, obtained upon start-up from the enhanced AT compatible partition block 240, and then adds the offset to the normal address requested by the operating system disk function call and obtains an adjusted disk address, represented by activity block 274. The disk function is then performed using the adjusted address, represented by activity block 276. Because the NEC 9801 compatible operating system uses logical sector addressing, this offset is transparent to the operating system.

If a device driver (not shown) or a user needs to access disk space outside of the NEC 9801 partition, then absolute disk address calls can be used and the offset routine will not affect these absolute address disk function calls.

By performing the address offset at the NEC 9801 compatible BIOS level, an NEC 9801 compatible operating system requires no modification and may issue all disk function requests as it would in a NEC 9801 compatible computer.

Figure 9:
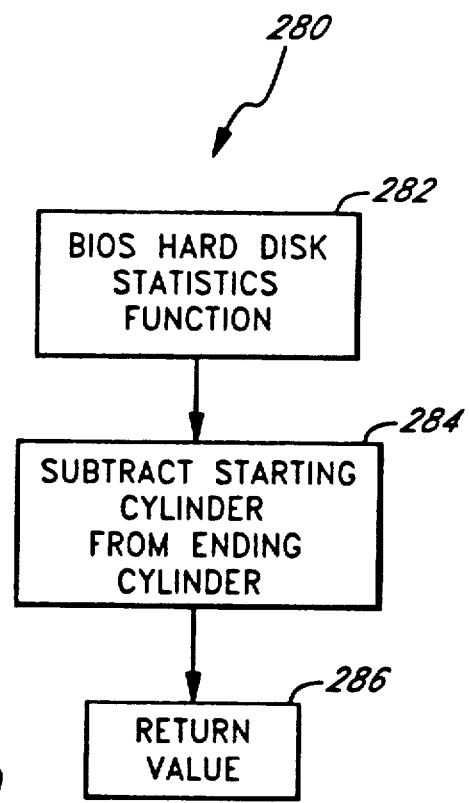
FIG. 9 illustrates a flow chart for a disk statistics function performed in accordance with the present invention.

The NEC 9801 compatible BIOS function to return disk statistics is also modified according to the present invention. Conventionally, upon receiving a disk statistics request, the NEC 9801 compatible BIOS would return the size of the entire hard disk. According to the present invention, the NEC 9801 compatible system does not control the entire hard disk. Therefore, the modified NEC 9801 compatible BIOS performs the disk statistics function as shown in the flow chart in FIG. 9. When the NEC 9801 compatible BIOS receives a disk statistics function call, represented by activity block 282, it then subtracts the starting cylinder from the ending cylinder of the NEC 9801 system partition as defined in the AT compatible partition block 240, as represented in activity block 286. The modified NEC 9801 compatible BIOS then returns this value as the size of the hard disk, as represented in activity block 286. This value is the size of the partition on the hard disk allocated to the NEC 9801 system.

Other embodiments of the present invention will be obvious to those skilled in the art and will not detract from the subject matter regarded as invention.

What is claimed is:

1. A method for operating first and second absolute sector zero boot loaders on a disk drive in a computer having first and second operating modes, said first boot loader including first boot load instructions and a first partition table identifying a first operating system associated with said first boot loader, said second boot loader including second boot load instructions and a second partition table identifying a second operating system associated with said second boot loader, comprising the steps of:

storing said first boot loader at absolute sector zero of said disk drive, said first boot loader including a mode identifier that indicates the operating mode of said computer;

storing said second boot loader at a selected sector of said disk drive other than sector zero;

storing an identifier for said second boot loader in said first partition table of said first boot loader, said second boot loader identifier including a pointer to said selected sector at which said second boot loader is located; and upon initializing said computer:
   (A) loading a first BIOS;
   (B) examining said mode identifier; and,
      (1) when said mode identifier indicates that said first operating mode is selected, executing said first boot load instructions,
      (2) when said mode identifier indicates that said second operating mode is selected,
         (a) loading a second BIOS;
         (b) examining said first partition table to locate the starting sector of said second boot loader;
         (c) storing an offset value corresponding to said starting sector of said second boot loader; and
         (d) executing said second boot load instructions, said second boot loader instructions operating as if loaded at absolute sector zero without modification of said second boot loader instructions.

2. The method as defined in claim 1, further including the step of:
   responding to a disk access request to a selected physical address on said disk while in said second operating mode by adding said offset value to said selected physical address to obtain an absolute physical address for said disk.

3. The method as defined in claim 1, wherein said second partition table includes sector numbers that identify partition boundaries for sectors allocated to said second operating system, said partition boundaries referenced to absolute sector zero, said sectors allocated to said second operating system physically located on said disk at absolute sector addresses above said selected sector, said second BIOS automatically adding said offset value to addresses for disk accesses from said operating system so that said second operating system can reference disk addresses to absolute sector zero and transfer data to and from said sectors allocated to said second operating system.

* * * * *